(12) United States Patent
Agostini et al.

(10) Patent No.: US 12,066,255 B2
(45) Date of Patent: Aug. 20, 2024

(54) BLANK FOR A HEAT-TRANSFER DEVICE AND METHOD TO PRODUCE A HEAT-TRANSFER DEVICE

(71) Applicant: ABB Schweiz AG, Baden (CH)

(72) Inventors: Bruno Agostini, Zürich (CH); Daniele Torresin, Baden (CH); Andrey Petrov, Zürich (CH)

(73) Assignee: ABB SCHWEIZ AG, Baden (CH)

( * ) Notice: Subject to any disclaimer, the term of this patent is extended or adjusted under 35 U.S.C. 154(b) by 168 days.

(21) Appl. No.: 17/665,798

(22) Filed: Feb. 7, 2022

(65) Prior Publication Data

US 2022/0260322 A1 Aug. 18, 2022

(30) Foreign Application Priority Data

Feb. 12, 2021 (EP) .................................... 21156769

(51) Int. Cl.
*F28D 15/02* (2006.01)
*B22F 5/10* (2006.01)
*B23P 15/26* (2006.01)
*F28D 15/04* (2006.01)
*B33Y 80/00* (2015.01)

(52) U.S. Cl.
CPC ............ *F28D 15/0283* (2013.01); *B22F 5/10* (2013.01); *B23P 15/26* (2013.01); *F28D 15/046* (2013.01); *B22F 2998/10* (2013.01); *B23P 2700/09* (2013.01); *B33Y 80/00* (2014.12)

(58) Field of Classification Search
CPC ............... F28D 15/0283; F28D 15/046; F28D 15/0233; F28D 15/02; B23P 2700/09; B33Y 80/00
See application file for complete search history.

(56) References Cited

U.S. PATENT DOCUMENTS

| | | | | |
|---|---|---|---|---|
| 4,353,415 A | * | 10/1982 | Klaschka | F28D 15/0233 29/890.032 |
| 2007/0089376 A1 | * | 4/2007 | Wong | F28D 15/0283 53/50 |
| 2009/0040726 A1 | * | 2/2009 | Hoffman | F28D 15/0233 29/890.032 |
| 2011/0155350 A1 | | 6/2011 | Huang et al. | |
| 2011/0192004 A1 | | 8/2011 | Wang | |

(Continued)

FOREIGN PATENT DOCUMENTS

| | | |
|---|---|---|
| JP | S61213599 A | 9/1986 |
| JP | S62245086 A | 10/1987 |

OTHER PUBLICATIONS

"Cold welding", Wikipedia Article, archived on Jan. 8, 2021, retrieved on Jan. 25, 2022.

(Continued)

*Primary Examiner* — Tho V Duong
(74) *Attorney, Agent, or Firm* — McCarter & English, LLP

(57) ABSTRACT

Disclosed herein is a blank for a heat-transfer device that includes a vapor chamber enclosed by a body of the heat-transfer device, and a charging tube connected to the vapor chamber, wherein a part of the charging tube protruding from the body has at least one unsealed sealing zone with an oblong flow area, where a width of the charging tube exceeds a height of the charging tube.

11 Claims, 2 Drawing Sheets

(56) References Cited

U.S. PATENT DOCUMENTS

| | | | |
|---|---|---|---|
| 2012/0285662 A1* | 11/2012 | Meyer, IV | F28D 15/04 165/104.26 |
| 2013/0239410 A1 | 9/2013 | Chung et al. | |
| 2015/0129177 A1* | 5/2015 | Pai | F28D 15/046 165/104.26 |
| 2017/0343294 A1 | 11/2017 | Phan et al. | |
| 2018/0106553 A1 | 4/2018 | Bozorgi et al. | |

OTHER PUBLICATIONS

"Cold welding", Wikipedia Article, last edited on Sep. 21, 2021, 3 pages.

Chen et al., "Design, fabrication and thermal performance of a novel ultra-thin vapour chamber for cooling electronic devices", Enegery Conversion and Management, vol. 187, 2019, pp. 221-231.

Extended European Search Report issued in European Application No. 21156769.8, dated Aug. 5, 2021, 6 pages.

* cited by examiner

BLANK FOR A HEAT-TRANSFER DEVICE AND METHOD TO PRODUCE A HEAT-TRANSFER DEVICE

CROSS-REFERENCE TO RELATED APPLICATION

This application claims priority to European Patent Application No. EP21156769.8, filed Feb. 12, 2021 and titled "BLANK FOR A HEAT-TRANSFER DEVICE AND METHOD TO PRODUCE A HEAT-TRANSFER DEVICE", which is hereby incorporated by reference in its entirety.

BACKGROUND

The present disclosure relates to a blank for a heat-transfer device and a method to produce a heat-transfer device.

A heat-transfer device may be a phase-change device. The heat-transfer device may keep a fluid inside a chamber of the heat-transfer device in a vacuum. The vacuum affects a phase-change temperature of the fluid. An evaporation temperature of the fluid may be defined by a heat load, an ambient air temperature and an amount of phase-change fluid.

The chamber may be filled with the fluid, evacuated and sealed from a surrounding atmosphere. To seal the chamber, a charging tube leading into the chamber may be welded shut.

BRIEF DESCRIPTION

The present disclosure provides an improved blank for a heat-transfer device. Further exemplary embodiments are evident from the dependent claims and the following description.

Embodiments of the present disclosure relate to a blank for a heat-transfer device, including a vapor chamber enclosed by a body of the heat-transfer device, and a charging tube connected to the vapor chamber, wherein a part of the charging tube protruding from the body has at least one unsealed sealing zone with an oblong flow area, where a width of the charging tube exceeds a height of the charging tube.

Embodiments of the present disclosure further relate to a method to produce a heat-transfer device, the method including supplying the blank, injecting a working fluid into the vapor chamber through the unsealed sealing zone and the charging tube, evacuating the vapor chamber through the unsealed sealing zone and the charging tube, squeezing the unsealed sealing zone flat, wherein the oblong flow area of the unsealed sealing zone is blocked into a flat shape of a closed sealing zone, and cold-welding the closed sealing zone to create a sealed sealing zone.

A heat-transfer device may use two consecutive phase changes of a fluid enclosed in a vapor chamber of the heat-transfer device to transfer thermal energy through the device. A first phase change may be an evaporation of the fluid from liquid to vapor. A second phase change may be a condensation of the fluid from vapor to liquid. A vacuum inside the vapor chamber may affect a temperature of the phase changes.

A blank may be referred to as unfinished heat-transfer device. The blank may yet have no fluid inside the vapor chamber and the vapor chamber may be open to a surrounding atmosphere, so that a pressure inside the vapor chamber may be equal to a pressure outside the vapor chamber.

A heat source may define a warm side of the heat-transfer device. The heat source may be thermally connected to the warm side. The heat source may supply the thermal energy. A heat sink may define a cold side of the heat-transfer device. The heat sink may be thermally connected to the cold side. The heat sink may absorb the thermal energy. The heat source may be a microprocessor, for example. The heat sink may be a heat dissipator, for example.

The vaporization takes place at the warm side. Ideally, the thermal energy from the heat source is isothermally absorbed by the enthalpy of the vaporization and leads to the first phase change from liquid to vapor. The vapor transports the thermal energy through the vapor chamber to the cold side.

The condensation of the vapor takes place at the cold side. Ideally, the enthalpy of the condensation is isothermally released to the heat sink and leads to the second phase change from vapor back to liquid. The liquid moves back through the vapor chamber to the warm side.

The movement of the different phases of the fluid is driven by a concentration gradient inside the vapor chamber. The vapor is produced at the warm side and disappears at the cold side. The liquid is produced at the cold side and disappears at the warm side. The liquid fluid may be affected by gravity.

A wick inside the vapor chamber may facilitate the movement of the liquid back to the warm side by capillary forces. The capillary forces may overcome gravity to a certain extent. The capillary forces may be caused by the fluid being attracted to pores in the wick.

A charging tube may be a means to change the blank into a functioning heat-transfer device. Through the charging tube the fluid may be filled into the vapor chamber. The pressure inside the vapor chamber may be reduced by sucking gasses out of the vapor chamber through the charging tube. The set pressure may be separated from the surrounding atmosphere by closing or sealing the charging tube. The charging tube may be closed by pinching it flat. During the pinching, a material of the charging tube is bent and deformed plastically. Stress in the material may be dependent on an amount of bending and deformation.

The sealing may take place at a predetermined sealing zone of the charging tube. The sealing zone in an unsealed condition may provide a necessary flow area to inject the fluid into the vapor chamber and extract the gasses from the vapor chamber. The sealing zone may be compressed to close off the flow area to zero.

The unsealed sealing zone may have an oblong flow area with a special flattened shape. The special shape may require a limited amount of deformation until the flow area is zero. As the deformation is limited, tensions and stress in the material of the sealing zone are also limited. The flattened shape may reduce a displacement of material during the compression of the oblong flow area. Strain hardening of the material may be limited due to the flattened shape. Cracks may be avoided.

The flow area of the unsealed sealing may be is approximately equal to a flow area of the charging tube aside from the sealing zone. The oblong flattened shape may have an aspect ratio between 0.1 and 0.9. The oblong flow area may be a rectangle, a rhomboid or a stretched polygon, for example.

A cold-welding process may fuse the material of the sealing zone together without melting the material. The cold-welding process may use pressure and a controlled warming of the material to bond the material on a molecular or atomic level. Touching surfaces may be ground into each other during the cold-welding process. A flammable fluid may be used in the vapor chamber, as an ignition temperature of the flammable fluid is not reached during the cold-welding process.

In an embodiment, the fluid is degassed through the unsealed sealing zone and the charging tube prior to cold-welding. The fluid may be degassed by heating it up. The whole body of the heat-transfer device may be heated. Resulting vapor and escaping gasses may exit through the charging tube. The vapor chamber may be evacuated prior to the degassing. The charging tube may also be longer and have more than one sealing zone. An outer sealing zone may be sealed prior to the degassing. The escaping gasses may be trapped in the charging tube. An inner sealing zone may be sealed at an end of the degassing. The escaped gasses may be trapped in the charging tube.

In an embodiment, the closed sealing zone is cold-welded using an ultrasound welding process. An ultrasound welding process uses pressure and friction caused by ultrasonic vibrations to join two contacting surfaces. During the ultrasound welding process, the sealing zone may be compressed between an anvil and a vibrating sonotrode. The anvil and sonotrode may squeeze the sealing zone flat before the cold-welding process begins. Alternatively, a friction welding process may be used In an embodiment, the oblong flow area of the unsealed sealing zone is biconcave. A biconcave sealing zone may have acute or sharp edges. Stress during the squeezing may be minimized in an area of the edges. The biconcave shape may be formed by joining two ring segments, for example. The biconcave shape may also be referred to as lanceolate with a tapered point at both ends.

In an alternative embodiment, the oblong flow area of the unsealed sealing zone is oval. An oval sealing zone has rounded edges. An oval shape may be easy to shape.

In an embodiment, the charging tube has a prismatic partition with a constant flow area.

The prismatic partition may have a round, a rectangular or a hexagonal flow area. The prismatic partition may have the oblong flow area of the sealing zone. The prismatic partition may be arranged inside or outside of the body. A height of the prismatic partition may be equal to a height of the vapor chamber.

In an embodiment, the charging tube has a tapered partition with a changing shape. The tapered partition may be arranged inside or outside of the body. The changing shape of the tapered partition may transition from one adjoining shape to another adjoining shape. The tapered partition may allow soft transitions between different shapes. The tapered partition may allow advantageous fluid dynamics during the injection and the evacuation. The tapered partition may be a transition to the sealing zone.

In an embodiment, the part of the charging tube protruding from the body has at least another unsealed sealing zone with an oblong flow area, where a width of the charging tube exceeds a height of the charging tube. The sealing zones may be shaped equal. If one sealed sealing zone fails, the other may still be leakproof. Two or more sealing zones may result in a safer seal.

In an embodiment, at least one partition of the charging tube is arranged between the sealing zones. The sealing zones may be some distance apart. This way, a failure in one sealing zone may not affect the other sealing zone. The distance may prevent a propagation of cracks. Between the partition and the sealing zones acute or soft transitions may be used.

In an embodiment, the body and the charging tube are selectively sintered from loose metal powder grains by additive manufacturing. With additive manufacturing advantageous shapes may be created. Unused metal powder grains may be shaken out of the vapor chamber through the charging tube and the unsealed sealing zone. Selectively sintered material may have advantageous thermal characteristics but may be brittle. The cold-welding of the sintered material may be facilitated by the oblong flow area of the sealing zone. The metal material may be an aluminum material, for example. The metal material may be an alloy. The body may be sintered according to a CAD model. The body may be shaped irregularly.

In an embodiment, the part of the charging tube protruding from the body is sintered integrally with the body. This way, only one monolithic piece may be extracted from the loose metal powder grains.

These and other aspects of the present disclosure will be apparent from and elucidated with reference to the embodiments described hereinafter.

BRIEF DESCRIPTION OF THE DRAWINGS

The subject matter of the present disclosure will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
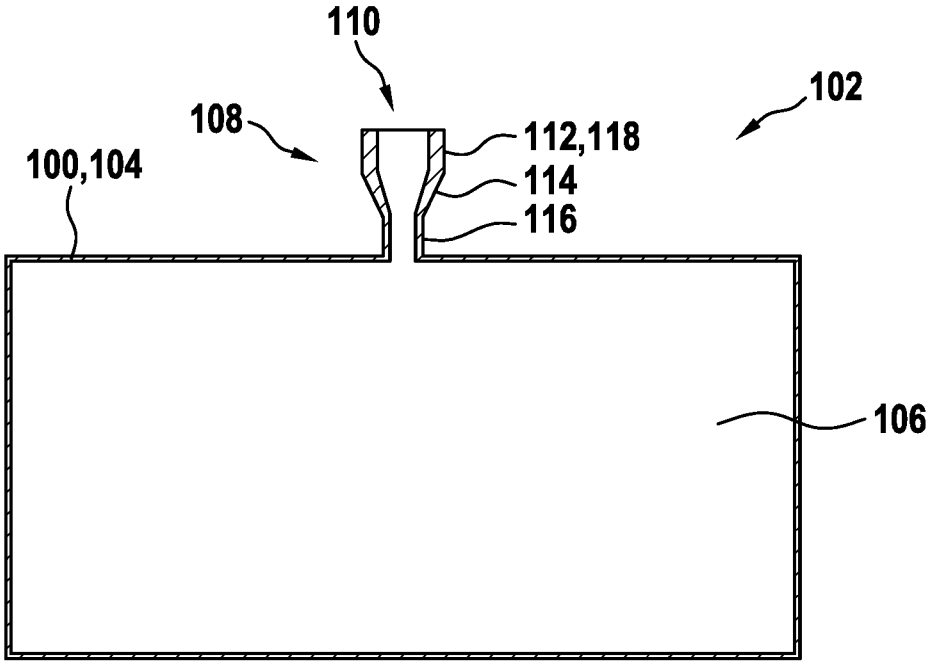
FIG. 1 is a schematic view of a blank according to an embodiment.

FIG. 1 is a schematic view of a blank 100 according to an embodiment. The blank 100 is an unfinished heat-transfer device 102. The heat-transfer device 100 is a phase-change heat- transfer device 102. The heat-transfer device 100 has a fluid-proof body 104. The body 104 encloses a vapor chamber 106. A charging tube 108 is connected to the vapor chamber 106. The charging tube 108 partially protrudes from the body 104. As the blank 100 is not yet a functioning phase-change heat-transfer device 102, the charging tube 108 has an open end 110 protruding from the body 104. An unsealed sealing zone 112 is arranged at the open end 110.

The unsealed sealing zone 112 has an oblong flow area to facilitate squeezing the charging tube 108 flat prior to cold-welding the compressed sealing zone 112.

In an embodiment the unsealed sealing zone 112 has an oval flow area.

In an embodiment, the charging tube 108 has a tapered partition 114 arranged between the sealing zone 112 and the body 104. In the tapered partition 114 a shape of the charging tube 118 gradually changes along a length of the tapered partition 114. Here the shape changes from a cylindrical flow area to the oblong flow area of the sealing zone 112.

In an embodiment, the flow area of the charging tube 108 stays constant throughout its length.

In an embodiment, the charging tube 108 has two prismatic partitions 116, 118 arranged on either side of the tapered partition 114. The shape of the prismatic partitions 116, 118 is constant along a length of the prismatic partitions 116, 118. The first prismatic partition 116 is arranged inside a wall of the body 104 and connects the tapered partition 114 to the vapor chamber 106. The second prismatic partition 118 forms the sealing zone 112 and has the oblong flow area.

To produce the heat-transfer device 102, the vapor chamber 106 is first evacuated through the charging tube 108 and then partially filled with a fluid through the charging tube 108. Finally, the charging tube 108 is closed off to keep the vacuum inside the vapor chamber 106. Because of the vacuum the fluid is in saturation conditions, where a certain fraction of the fluid is liquid, and a remaining volume is occupied by the vapor phase of the same fluid. The resulting underpressure is set by the temperature of the fluid inside the vapor chamber. During filling operation, the temperature is basically the ambient temperature. Then during working conditions, the internal fluid pressure and temperatures increase due to the heat applied on the warm side.

An evaporation temperature of the fluid is set by the underpressure inside the casing. The underpressure also determines a condensation temperature of the fluid. The evaporation temperature and the condensation temperature are essentially equal. This way, thermal energy from a heat source can be transported to a heat sink at the evaporation temperature, as long as there is liquid fluid available at the warm side.

To close off the open end 110 of charging tube 108, the unsealed sealing zone 112 is compressed in a die. After the compression, inner surfaces of the sealing zone 112 are in close contact along a length of the sealing zone. To secure the now closed end 110, the sealing zone 112 is cold welded and the inner surfaces are fused together.

Figure 2:
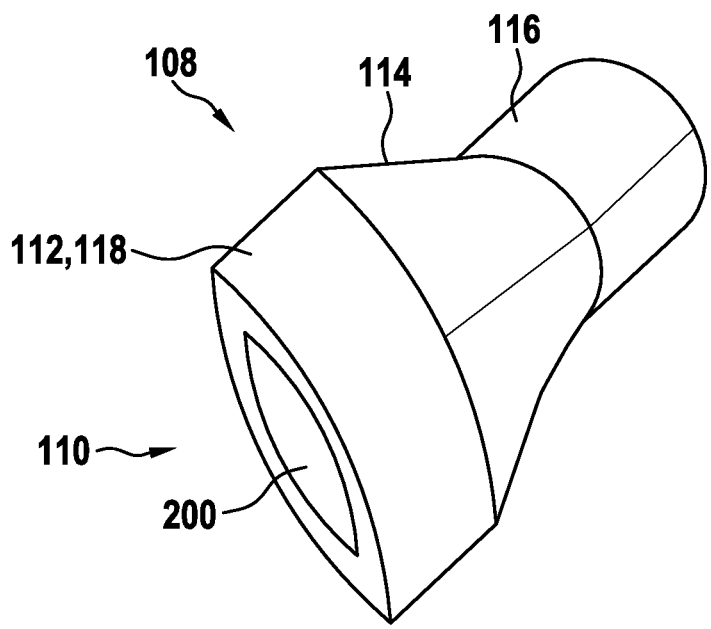
FIG. 2 shows a charging tube with a sealing zone according to an embodiment.

FIG. 2 shows the charging tube 108 of FIG. 1 with an unsealed sealing zone 112 according to an embodiment. The sealing zone 112 has a biconcave oblong flow area 200. The oblong flow area 200 has a long axis and a short axis. The short axis has an aspect ratio of 0.1 to 0.9 to the long axis. Here the long axis is approximately four times longer than the short axis, resulting in an aspect ratio of 1:4. The flow area 200 is sharp edged at the ends of the long axis.

In an embodiment, the charging tube 108 has three partitions 114, 116, 118. The sealing zone 112 is arranged at the open end 110 of the charging tube 108 and consists of a prismatic partition 118. The tapered partition 114 is arranged between the two prismatic partitions 116, 118 and morphs the biconcave oblong flow area 200 of the unsealed sealing zone 112 to a circular flow area of the other prismatic partition 116.

Figure 3:
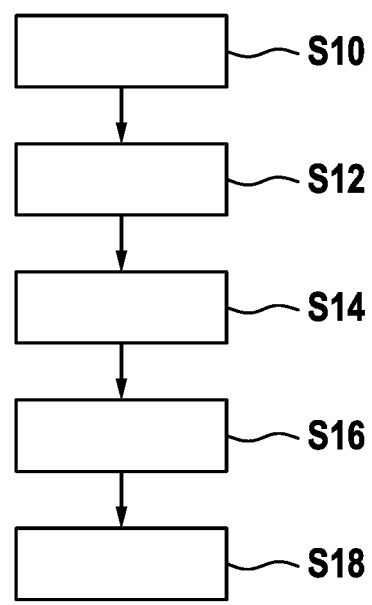
FIG. 3 shows a flow diagram for a method for producing the heat-transfer device of FIG. 1 according to an embodiment of the present disclosure.

FIG. 3 shows a flow diagram for a method for producing the heat-transfer device 102 such as shown in FIG. 1.

In step S10, a blank 100 for the heat-transfer device 102 is provided.

In step S12, a working fluid is injected into the vapor chamber. The working fluid is injected through the unsealed sealing zone 112 and the charging tube 108.

In step S14, the vapor chamber 106 is evacuated. the vapor chamber 106 is evacuated through the unsealed sealing zone 112 and the charging tube 108.

In step S16, the unsealed sealing zone 112 is squeezed flat, so that the oblong flow area 200 of the unsealed sealing zone 112 is blocked into a flat shape of a closed sealing zone 112.

In step S18, the closed sealing zone 112 is cold-welded to create a sealed sealing zone 112.

In other words, a variable section charging tube for vapor chambers is presented.

A novel design of charging tube for vapor chambers is disclosed, that has a variable section along the tube. This way a more reliable sealing of the charging tube is achieved by decreasing the stress inside the tube wall during the deformation required by the sealing process.

The novel design enables the use of cold welding for sealing a vapor chamber filled with flammable fluids.

Conventional vapor chambers are made of copper, rendered highly ductile by the diffusion bonding process used during assembly.

To produce a heat-transfer device, a fluid filling process includes liquid injection, evacuation, degassing and head welding. The working fluid may be deionized water. In the evacuation process, most of the air in the vapor chamber is evacuated with a vacuum pump. Then, in the degassing process, additional air is removed via boiling. By heating the bottom of the vapor chamber, the non-condensable gas in the tube is forced to accumulate in the upper part of the charging pipe, and this section of the pipe may then be cut away to further enhance the degree of vacuum. Finally, in the head welding process, the end of the charging pipe is welded shut to achieve a stable environment inside the vapor chamber.

If the working fluid is not water, then it is not possible to weld the head of the charging pipe because of safety issues. For example, if the vapor chamber is made of aluminum, water cannot be used because of corrosion, alternatively acetone or hydro-fluoro fluids may be used.

However, acetone is flammable and hydro-fluoro fluids may be flammable or decompose into toxic or corrosive by products under the intense heat generated during welding. In such case, a cold-welding process may be used.

Cold welding is a solid-state welding process in which joining takes place without fusion/heating at the interface of the two parts to be welded. Unlike in the fusion-welding processes, no liquid or molten phase is present in the joint. For example, ultrasonic welding is a cold-welding process. However, since these processes generally involve a mechanical flattening of the charging tube, conventionally, a ductile material is required in order to obtain a reliable sealing. With a non-ductile material, cracks may develop inside the tube wall during the flattening and jeopardize the sealing.

Additive manufacturing may produce low ductility parts that may be annealed at high temperature in order to gain sufficient ductility. Nevertheless, even after such heat-treatment some of the alloys used with additive manufacturing process would still not be ductile enough. This limitation of low-ductility alloys can be overcome by the presented charging tube design described here.

In an embodiment, the fluid charging tube for the vapor chamber has cross sections that are different at each end.

In an embodiment, the cross-section of the end connected to the vapor chamber has a larger aspect ratio than the end to be sealed (aspect ratio=dmin/dmax).

In an embodiment, the cross-section of the end connected to the vapor chamber is substantially circular and the end to be sealed has a pinched cross-section. The pinched cross-section may be formed of two arcs for example.

In an embodiment, the tube may be be decomposed in at least three sub-sections.

In an embodiment, the section after the end connected to the vapor chamber is a straight sub-section of constant cross-section.

In an embodiment, the section before the end to be sealed is a straight sub-section of constant cross-section, but different than the end connected to the vapor chamber.

In an embodiment, a variable cross-section sub-section is arranged between the straight sub-sections of constant cross-sections. The variable cross-section sub-section transitions from the cross-section of the first straight sub-section to the other straight sub-section. The path of the transition may be a straight line or a curve.

In an embodiment, the charging tube has more than three variable sub-sections for double sealing.

In an embodiment, the second straight sub-section has an elongated shape (x>y), for instance an oval, rectangle, rhombohedral, stretched polygon or other. Thus, when a cold-welding process is employed, the relative displacement in such an elongated cross-section is reduced, allowing for the use of less ductile alloys.

In an embodiment, the charging tube is subdivided into more than three sub-sections. For instance, the filling process may rely on the sealing in two different cross-sections, to minimize the risk of trapping non-condensable gas inside the vapor chamber. In this case the filling tube may have multiple sub-sections, including two with elongated cross-section, for sealing.

While embodiments of the present disclosure have been illustrated and described in detail in the drawings and foregoing description, such illustration and description are to be considered illustrative or exemplary and not restrictive. The present disclosure is not limited to the disclosed embodiments. Other variations to the disclosed embodiments can be understood and effected by those skilled in the art and practicing the present disclosure, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 100 blank
102 heat-transfer device
104 body
106 vapor chamber
108 charging tube
110 open end
112 sealing zone
114 tapered partition
116 prismatic partition
118 prismatic partition
200 flow area

The invention claimed is:

1. A blank for a heat-transfer device, the blank comprising:
   a vapor chamber enclosed by a body of the heat-transfer device; and
   a charging tube connected to the vapor chamber,
   wherein a part of the charging tube protruding from the body has at least one unsealed sealing zone with an oblong flow area,
   wherein the charging tube has a tapered partition arranged between the at least one unsealed sealing zone and the body,
   wherein a shape of the tapered partition changes along a length of the tapered partition from a cylindrical flow area to the oblong flow area, and
   wherein a width of the charging tube exceeds a height of the charging tube.

2. The blank of claim 1, wherein the oblong flow area of the at least one unsealed sealing zone is biconcave.

3. The blank of claim 1, wherein the oblong flow area of the at least one unsealed sealing zone is oval.

4. The blank of claim 1, wherein the charging tube has a prismatic partition with a constant flow area.

5. The blank of claim 1, wherein the part of the charging tube protruding from the body has at least another unsealed sealing zone with an oblong flow area.

6. The blank of claim 5, wherein at least one partition of the charging tube is arranged between the unsealed sealing zones.

7. The blank of claim 1, wherein the body and the charging tube are selectively sintered from loose metal powder grains by additive manufacturing.

8. The blank of claim 7, wherein the part of the charging tube protruding from the body is sintered integrally with the body.

9. A method to produce a heat-transfer device, the method comprising:
   supplying the blank according to claim 1;
   injecting a working fluid into the vapor chamber through the at least one unsealed sealing zone and the charging tube;
   evacuating the vapor chamber through the at least one unsealed sealing zone and the charging tube;
   squeezing the unsealed sealing zone flat, wherein the oblong flow area of the at least one unsealed sealing zone is blocked into a flat shape of a closed sealing zone; and
   cold-welding the closed sealing zone to create a sealed sealing zone.

10. The method of claim 9, wherein the working fluid is degassed through the at least one unsealed sealing zone and the charging tube prior to cold-welding.

11. The method of claim 9, wherein the closed sealing zone is cold-welded using an ultrasound welding process.

* * * * *